United States Patent
Caillot et al.

(10) Patent No.: US 11,130,472 B2
(45) Date of Patent: Sep. 28, 2021

(54) WIPING DEVICE FOR MOTOR VEHICLE WINDOWS, COMPRISING A WINDSCREEN WIPER FRAME AND A PIEZOELECTRIC FILM

(71) Applicant: Valeo Systèmes d'Essuyage, Le Mesnil Saint Denis (FR)

(72) Inventors: Gérald Caillot, Le Mesnil Saint Denis (FR); Vincent Izabel, Le Mesnil Saint Denis (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 28 days.

(21) Appl. No.: 16/345,030

(22) PCT Filed: Oct. 20, 2017

(86) PCT No.: PCT/EP2017/076900
§ 371 (c)(1),
(2) Date: Apr. 25, 2019

(87) PCT Pub. No.: WO2018/077757
PCT Pub. Date: May 3, 2018

(65) Prior Publication Data
US 2019/0275987 A1    Sep. 12, 2019

(30) Foreign Application Priority Data
Oct. 25, 2016   (FR) ...................................... 1660334

(51) Int. Cl.
*B60S 1/04*    (2006.01)
*B60S 1/48*    (2006.01)
(Continued)

(52) U.S. Cl.
CPC ............... *B60S 1/0491* (2013.01); *B60S 1/38* (2013.01); *B60S 1/481* (2013.01); *B60S 1/482* (2013.01);
(Continued)

(58) Field of Classification Search
CPC ........ B60S 1/0491; B60S 1/1482; B60S 1/38; B60S 1/481; B60S 1/3805; B60S 1/3803;
(Continued)

(56) References Cited

U.S. PATENT DOCUMENTS 5,070,571 A * 12/1991 Arai ...................... B60S 1/3801
15/250.001

FOREIGN PATENT DOCUMENTS

DE    102013000869 A1 *  3/2014 ............ B60S 1/3806
EP       1600428 A1     11/2005
(Continued)

OTHER PUBLICATIONS

International Search Report and Written Opinion Issued in Correponding PCT Application No. PCT/EP2017/076900, dated Jan. 17, 2018 (11 Pages with English Translation of International Search Report).

*Primary Examiner* — Natasha N Campbell
(74) *Attorney, Agent, or Firm* — Osha Bergman Watanabe & Burton LLP (57) ABSTRACT

The invention relates to a wiping device for a motor vehicle window, comprising a windscreen wiper frame and a piezoelectric film, said piezoelectric film being mounted on the windscreen wiper frame such as to produce an electric current. The invention also relates to a warning method and a spray control method for such a wiping device.

11 Claims, 4 Drawing Sheets

(51) Int. Cl.
*B60S 1/38* (2006.01)
*B08B 1/00* (2006.01)
*B60S 1/34* (2006.01)
*G07C 5/08* (2006.01)

(52) U.S. Cl.
CPC ............ *G07C 5/0816* (2013.01); *B08B 1/005* (2013.01); *B60S 1/3411* (2013.01); *B60S 1/3805* (2013.01); *B60S 2001/3829* (2013.01); *B60S 2001/3844* (2013.01); *G07C 5/0825* (2013.01); *G07C 5/0833* (2013.01)

(58) Field of Classification Search
CPC .............................. B60S 1/3411; B60S 1/381; B60S 2001/3844; B60S 2001/3829; B08B 1/005
See application file for complete search history.

(56) References Cited

FOREIGN PATENT DOCUMENTS

| GB | 2106966 A | 4/1983 | |
|---|---|---|---|
| JP | 2015189273 A | 11/2015 | |
| WO | WO-9507199 A1 * | 3/1995 | ............ B60S 1/3411 |
| WO | 2015132049 A1 | 9/2015 | |

* cited by examiner

WIPING DEVICE FOR MOTOR VEHICLE WINDOWS, COMPRISING A WINDSCREEN WIPER FRAME AND A PIEZOELECTRIC FILM

TECHNICAL FIELD OF THE INVENTION

The invention relates to a wiping device for a motor vehicle glass.

TECHNICAL BACKGROUND TO THE INVENTION

Piezoelectricity involves transforming a field of mechanical pressure into electrical energy. It is known to use the piezoelectric properties of certain materials to supply electrical energy to motor vehicle equipment such as motor vehicle windscreen wiper frames or the equipment of these windscreen wiper frames belonging to a wiping device of a glass of the motor vehicle.

To do so, piezoelectric blocks that are arranged on the wiper rubber of a windscreen wiper frame that are designed to deform notably during the changes of direction of the wiper rubber that occur with each change of wiping direction in the to-and-fro movement of the windscreen wiper frame are known. The electricity created by the deformation of the piezoelectric blocks is then used to supply electric current to a piece of equipment of the motor vehicle.

However, the piezoelectric blocks have to be arranged in a location where said blocks are subjected to a field of mechanical pressure that is intense enough to deform the blocks. These arrangement constraints limit the capacity of the piezoelectric elements to generate electricity.

There is therefore a need to propose an alternative to the existing devices, in particular to provide greater flexibility in the supply of electrical energy by the piezoelectric elements. One of the objectives of the invention is to respond to this need.

SHORT SUMMARY OF THE INVENTION

For this purpose, the invention proposes a wiping device for a motor vehicle glass, comprising a windscreen wiper frame and a piezoelectric film, the piezoelectric film being mounted on the windscreen wiper frame such as to produce an electric current.

The positioning of the piezoelectric element in the form of a piezoelectric film on the windscreen wiper frame makes it possible to exploit the position and operation of the wiping device to generate electricity.

According to different aspects of the invention, which may be taken together or separately:
  the windscreen wiper frame has a wiper rubber designed to be in contact with the glass and to locally fit the shape thereof,
  the piezoelectric film is arranged on the windscreen wiper frame such as to be deformed with the wiper rubber and to generate the electric current when the windscreen wiper frame moves on the glass,
  the piezoelectric film is designed to be deformed under the effect of the vibrations and/or shocks created by operation of the vehicle,
  the piezoelectric film is designed to be deformed under the effect of an air flow about the motor vehicle,
  the wiping device also includes an electrical energy accumulation device, notably a capacitor, a super-capacitor or a battery, that is designed to be supplied with electric current by the piezoelectric film,
  the wiping device also includes a mechanical adjustment device that is designed to modify a contact pressure between the windscreen and the windscreen wiper frame as a function of the electric current created by the piezoelectric film.
  the wiping device includes a heating module, notably a heating film, that is designed to be supplied with electric current by the piezoelectric film.

The invention also relates to a warning method for such a wiping device comprising the following steps:
  analysis of the electric current generated by the piezoelectric film,
  counting the number of to-and-fro movements of the windscreen wiper frame,
  creating a warning signal, notably an audible and/or luminous signal, when the number of to-and-fro movements reaches a threshold value.

The invention also relates to a spray control method for such a wiping device, the wiping device also including a spray module that is designed to enable, alternately and/or cumulatively, a first spray mode of the glass and a second spray mode of the glass, the method comprising the following steps:
  analysis of the electric current generated by the piezoelectric film,
  detection of a change of direction of the windscreen wiper frame,
  triggering and/or stoppage of at least one of the first and second spray modes.

According to one aspect of the invention, the spray module is a two-way solenoid valve mounted on the windscreen wiper frame.

SHORT DESCRIPTION OF THE FIGURES

The invention can be better understood, and additional objectives, details, features and advantages thereof are set out more clearly, in the detailed description below of at least one embodiment of the invention given as a purely illustrative and non-limiting example, with reference to the drawings attached, in which.

The remainder of the purely illustrative and non-limiting description is divided into different parts starting with a title. Each of these parts describes one aspect and/or possible embodiment of the invention.

Figures 1A, 1B:
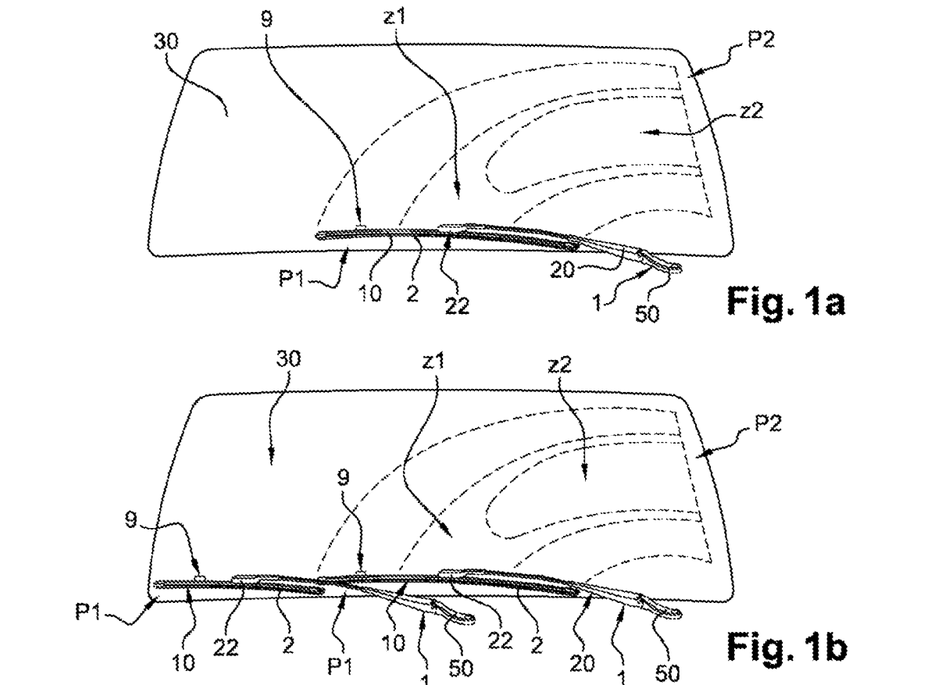
FIG. 1a is a schematic view of a windscreen of a motor vehicle showing example variations of the curve of a glass covered by a windscreen wiper frame of a wiping device according to the invention.
FIG. 1b is a schematic view of a windscreen of a motor vehicle showing example variations of the curve of a glass covered by two windscreen wiper frames of a wiping device according to another embodiment of the invention.
Figure 1C:
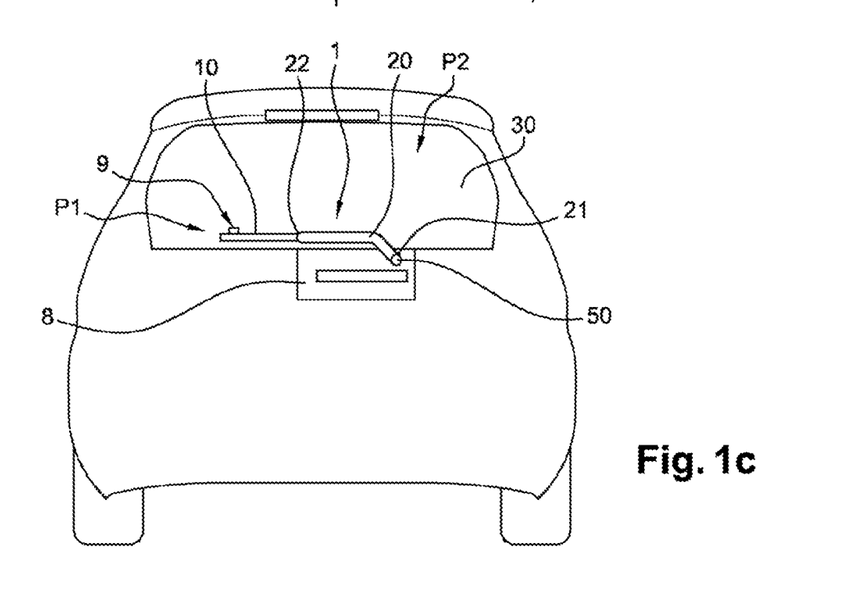
FIG. 1c is a front view of the rear portion of a motor vehicle fitted with a wiping device according to the invention.

As shown in FIGS. 1a to 1c the invention relates to a wiping device 1, notably for a glass of a motor vehicle. The wiping device includes a windscreen wiper frame 10 and a piezoelectric film 2.

Wiping Device

The wiping device 1 is a device designed to improve the visibility of a driver of the motor vehicle through the glass 30 of the motor vehicle. The glass 30 of the motor vehicle is for example a front wind screen, a rear glass of the motor vehicle or an outer surface of a motor vehicle rear-view mirror or of a headlamp of a motor vehicle. In this case, the glass 30 is a rear glass 30 of the motor vehicle.

Wiper Arm

The wiping device 1 also includes a windscreen wiper frame arm 20 and a motor 8. The motor 8 is in this case designed to drive the arm 20 in an angular to-and-fro movement. The arm 20 is designed to drive the windscreen wiper frame 10 in the to-and-fro movement. The windscreen wiper frame 10 is in this case connected to the arm 20 on an extension of the arm 20. The windscreen wiper frame 10 is designed to move in a to-and-fro movement between an idle position P1 and a stop position P2.

The arm 20 has a proximal end 21 and a distal end 22. The arm extends longitudinally from one of the ends 21, 22 to the other end 21, 22. The arm 20 is designed to be assembled at the proximal end 21 thereof to the motor 8 of the wiping device 1. The arm 20 is also designed to be assembled at the distal end 22 thereof to the windscreen wiper frame 10 in order to move said windscreen wiper frame.

As detailed below, the windscreen wiper frame 10 is designed to be in contact with the glass 30 of the motor vehicle. In particular, the windscreen wiper frame 10 is designed to be in contact with an outer surface of the rear glass 30.

Windscreen Wiper Frame

Figure 2:
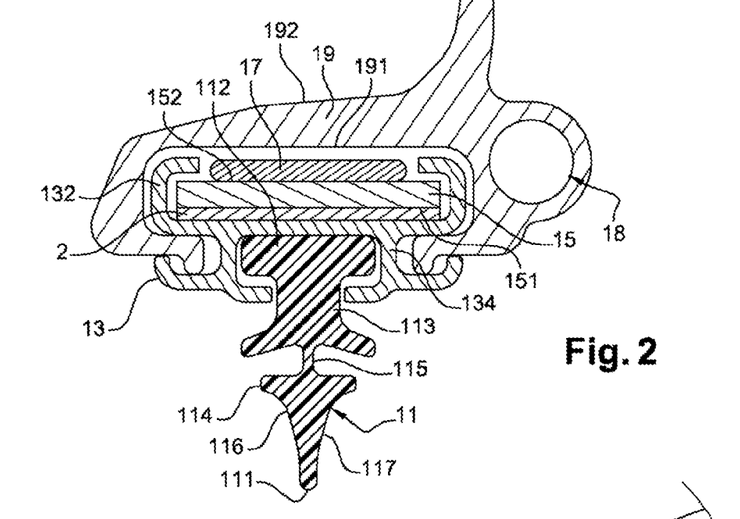
FIG. 2 is a cross section view of a windscreen wiper frame according to a first embodiment of the invention.
Figure 2A:
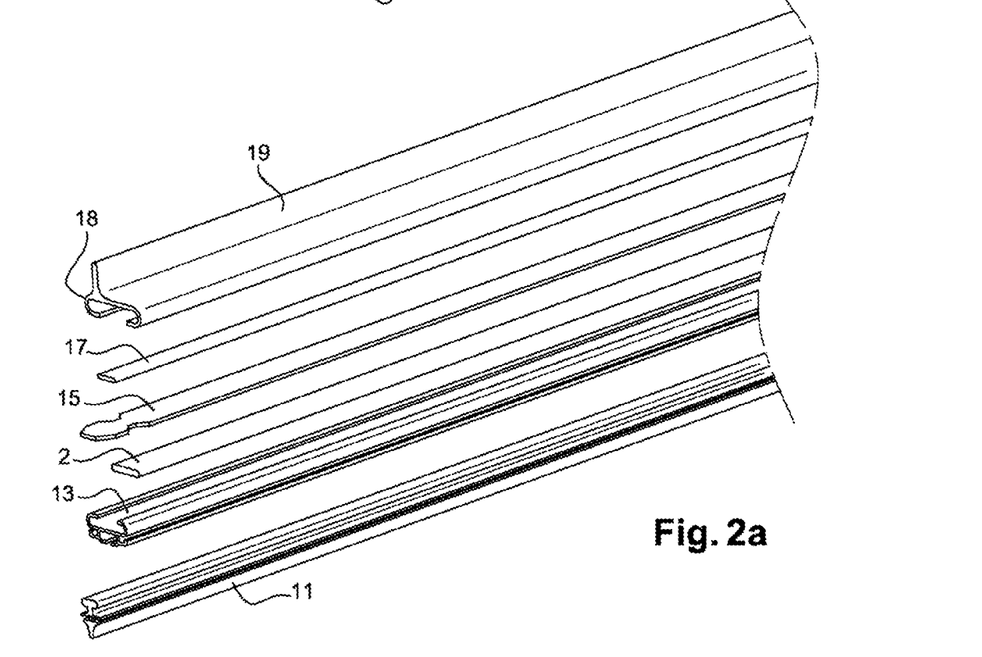
FIG. 2a is an exploded perspective view of a portion of the wiper blade shown in FIG. 2.

As shown in FIGS. 2 and 2a, the windscreen wiper frame 10 includes a wiper rubber 11, a holder 13 and at least one spline 15.

Holder

As shown in particular in FIG. 2, the holder 13 has a first longitudinal end and a second longitudinal end. The holder 13 extends longitudinally in a main longitudinal direction from the first longitudinal end to the second longitudinal end thereof. The holder 13 also has a height, measured orthogonal to the main longitudinal direction of the holder 13.

The holder 13 has a first longitudinal cavity 132, referred to as the upper cavity, and a second longitudinal cavity 134, referred to as the lower cavity. The two cavities 132, 134 in this case extend longitudinally from the first end to the second end of the holder 13. The upper cavity 132 and the lower cavity 134 are designed to act as seats for the spline 15 and the wiper rubber 11 respectively. Thus, the holder 13 acts as support for the spline 15 and for the wiper rubber 11.

The spline 15 is seated in the upper cavity 132 of the holder 13. The wiper rubber 11 is partially seated inside the lower cavity 134 of the holder 13.

The holder 13 is designed so that, once the wiping device 1 has been mounted on the motor vehicle, the holder 13 extends upwards in a direction substantially orthogonal to the outer surface of the rear glass 30 of the motor vehicle.

Wiper Rubber

The wiper rubber 11 is designed to wipe a portion or zone of the outer surface of the rear glass 30 when the windscreen wiper frame 10 moves to-and-fro across the rear glass 30.

The wiper rubber 11 is essentially designed to remove any liquid on the outer surface of the glass 30 and/or to clean same. The to-and-fro movement of the windscreen wiper frame 10 also removes any dirt on the glass 30.

The wiper rubber 11 in this case has a first longitudinal end and a second longitudinal end. The wiper rubber 11 extends longitudinally in a main longitudinal direction from the first longitudinal end to the second longitudinal end thereof.

The height of the wiper rubber 11 is measured in a direction (X). The direction (X) is orthogonal to the main longitudinal direction of the wiper rubber 11. The wiper rubber 11 has an upper end 112 and a lower end 111 and extends upwards from one to the other.

Furthermore, the lower end 111 of the wiper rubber 11 is a free edge 111 of the wiper rubber 11. The lower end 111 of the wiper rubber 11 is designed to be in contact with the glass 30.

Figures 4, 5, 6:
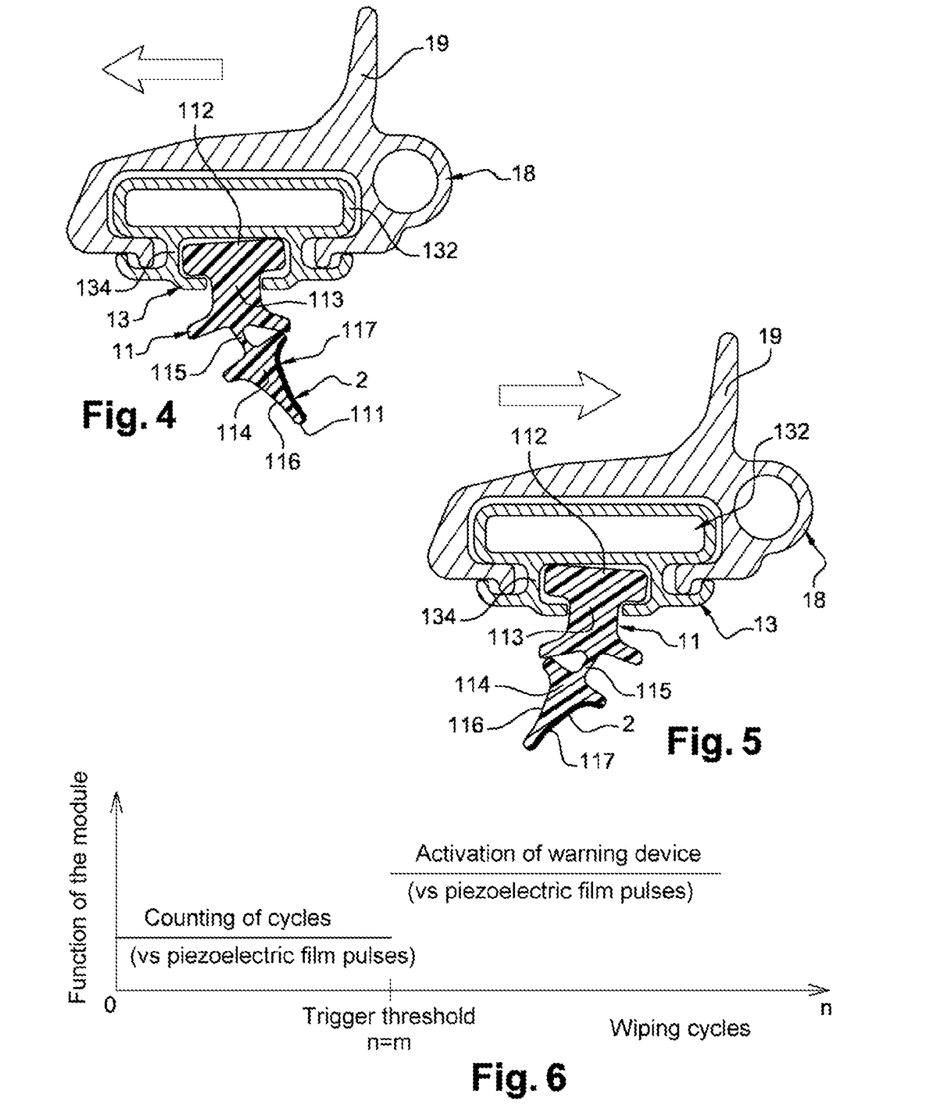
FIG. 4 is a cross section view of a windscreen wiper frame according to another embodiment of the invention, moving against a glass to be wiped in a downward direction.
FIG. 5 is a cross section view of the windscreen wiper frame shown in FIG. 4 moving in an upward direction.
FIG. 6 is a graph showing the operating modes of a counting module as a function of the number of wiping cycles performed by the wiping device.

As shown in particular in FIGS. 4 and 5, the direction (X) is not necessarily rectilinear. In this particular case, the direction (X) can be curved. This direction is deformed with the wiper rubber 11 during movement of the wiper blade 10, as explained below.

The wiper rubber 11 has an upper portion 113 and a lower portion 114 that are rigidly connected to each other. The upper portion 113 of the wiper rubber 11 is also referred to as the attachment portion, assembly portion or bead. The lower portion 114 of the wiper rubber 11 is referred to as the wiping portion.

The upper portion 113 and the lower portion 114 are linked to one another by an intermediate zone forming a hinge 115 that extends longitudinally from the first longitudinal end to the second longitudinal end of the wiper rubber 11. As shown in particular in FIGS. 4 and 5, the hinge zone 115 enables a deformation and a change of direction of the wiper rubber 11, enabling the lower portion 114 to pivot about the upper portion 113 of the wiper rubber 11 about the hinge zone 115 that forms the longitudinal pivot axis of the lower portion 114. This angular pivoting movement of the lower portion 114 in relation to the upper portion 113 occurs notably during a change of direction in the to-and-fro movement of the windscreen wiper frame 10 across the outer surface of the rear glass 30.

The lower portion 114 of the wiper rubber 11 includes the free edge 111. The upper portion 113 includes the upper end 112 of the wiper rubber 11.

The lower portion 114 of the wiper rubber 11 is designed to be in contact with the outer surface of the glass 30, notably by means of the free edge 111 thereof.

As shown in FIG. 2, the lower portion 114 of the wiper rubber 11 has a first side face 116 and a second side face 117. The first and second side faces 116, 117 extend longitudinally in the main longitudinal direction of the wiper rubber 11. The first and second side faces 116, 117 extend longitudinally from the first to the second longitudinal end of the wiper rubber 11.

As shown in particular in FIG. 2, the side faces 116, 117 extend substantially from the free edge 111 to the hinge zone 115.

The first and second side faces 116, 117 are substantially opposite one another. In other words, the side faces 116, 117 are arranged on either side of the wiper rubber 11. More specifically, the side faces 116, 117 are arranged on either side of and along the lower edge 111 of the wiper rubber 11.

The first side face 116 of the wiper rubber 11 is arranged on a side of the wiper rubber 11 that is substantially oriented towards the position P1 when the wiping device is mounted on the motor vehicle. The second side face 117 is arranged on a side of the wiper rubber 11 that is substantially oriented towards the position P2 when the wiping device is mounted on the motor vehicle.

As shown in FIG. 5, when the windscreen wiper frame 10 moves from the position P1 to the position P2, i.e. in an upward direction, the lower portion 114 of the wiper rubber 11 is inclined in relation to the upper portion 113 of the wiper rubber 11. In particular, the second side face 117 is then substantially facing the glass 30.

Furthermore, when the windscreen wiper frame 10 moves from the position P1 to the position P2, the second side face 117 of the wiper rubber 11 is stretched substantially in a direction orthogonal to the main longitudinal direction of the wiper rubber 11. The first side face 116 is compressed substantially in a direction orthogonal to the main longitudinal direction of the wiper rubber 11.

As shown in FIG. 4, when the windscreen wiper frame 10 moves from the position P2 to the position P1, i.e. in a downward direction, the lower portion 114 of the wiper rubber 11 is inclined in relation to the upper portion 113 of the wiper rubber 11. In particular, the first side face 116 is then substantially facing the glass 30.

Furthermore, when the windscreen wiper frame 10 moves from the position P2 to the position P1, the first side face 116 of the wiper rubber 11 is stretched substantially in a direction orthogonal to the main longitudinal direction of the wiper rubber 11. The second side face 117 is compressed substantially in a direction orthogonal to the main longitudinal direction of the wiper rubber 11.

The upper portion 113 of the wiper rubber 11 is designed to be mounted, at least partially, inside the lower cavity 134 of the holder 11.

The wiper rubber 11 is designed to be in direct contact with the outer surface of the glass 30 of the motor vehicle. The wiper rubber is made of flexible material, such as natural or synthetic rubber. The contact between the wiper rubber 11 and the glass 30 defines a contact zone. In this case, the contact zone is substantially linear and longitudinal. Furthermore, the contact zone is in this case unbroken along the wiper rubber 11, enabling a uniform wiping of the glass 30.

The windscreen wiper frame 10 is designed such that the wiper rubber 11 is deformed during the movement of the windscreen wiper frame 10 across the rear glass 30. This deformation enables the wiper rubber 11 to locally fit a curve of the glass 30. This deformation of the wiper rubber 11 ensures that the contact zone between the wiper rubber 11 and the glass 30 is continuous, as mentioned above.

Spline

The spline 15 of the windscreen wiper frame 10 provides the wiper rubber 11 with sufficient rigidity to keep the wiper rubber pressed against the outer surface of the glass 30. The spline 15 of the windscreen wiper frame 10 is designed to maintain the necessary and sufficient contact pressure between the free edge 111 of the wiper rubber 11 and the outer surface of the glass 30. The spline 15 ensures efficient wiping by enabling the contact zone between the wiper rubber 11 and the outer surface of the glass 30 to be and to remain continuous during movement of the windscreen wiper frame 10 across the outer surface of the glass 30.

The spline 15 is in this case a strip of material. The spline has a first longitudinal end and a second longitudinal end. The spline 15 extends longitudinally in a main longitudinal direction between the first longitudinal end and the second longitudinal end thereof.

The height, or thickness, of the spline 15 is measured perpendicular to the main longitudinal direction thereof. Once the different components of the wiping device 1 have been assembled, the spline 15 is arranged in the holder 13 such that the direction of the thickness of the spline 15 is substantially orthogonal to the outer surface of the glass 30 of the motor vehicle.

The spline 15 has an upper flat face 152 and a lower flat face 151. The lower face 151 and the upper face 152 extend parallel to one another and delimit the thickness of the spline 15.

The main longitudinal directions of the holder 13, the spline 15 and the wiper rubber 11 extend substantially parallel to one another.

As shown in FIGS. 2, 3, 4 and 5, the windscreen wiper frame 10 can also have a distribution line 18 designed to enable a liquid to be projected on to the glass 30, notably a cleaning, rinsing or deicing liquid. The distribution line 18 extends for example longitudinally in the main longitudinal direction of the windscreen wiper frame 10. The distribution line 18 is for example provided with projection orifices, not shown in the figures. The projection orifices can be spaced apart regularly along the distribution line 18. The projection orifices are designed to enable the liquid to be projected from inside the distribution line 18 towards the glass 30.

In a variant not shown, the windscreen wiper frame has for example two distribution lines. The distribution lines can then be arranged substantially on either side of the wiper rubber.

Piezoelectric Film

The piezoelectric film 2 is in this case a film or a thin strip of material made of a piezoelectric material. The piezoelectric material is designed to create an electric current when deformed and/or subjected to a field of mechanical pressure. The piezoelectric film 2 extends longitudinally from one end of the spline 15 to the other.

As shown in FIG. 2, the piezoelectric film 2 is for example arranged in one of the lower or upper cavities 134, 132 of the holder 13. In this case, the piezoelectric film 2 is arranged in the upper cavity 132 beneath the spline 15.

The piezoelectric film 2 is arranged against the spline 15 of the windscreen wiper frame 10, in particular in contact with the lower face 151 of the spline 15. The piezoelectric film 2 in this case extends longitudinally between the first longitudinal end and the second longitudinal end of the windscreen wiper frame 10.

Deformation of the Piezoelectric Film

As shown in FIG. 1a, the glass 30 notably includes the zones z1 and z2 located one behind the other along the path of the windscreen wiper frame 10 when same is moving between the positions P1 and P2. The zones z1 and z2 in this case have different curves. In particular, zone z1 has a lesser curve than zone z2. When the windscreen wiper frame 10 moves from the position P1 to the position P2, the windscreen wiper frame 10 then successively fits the curve of zone z1 then the curve of zone z2, which causes the deformation of the frame 10.

Thus, when moving across the glass 30 between the idle position P1 and the stop position P2, the windscreen wiper frame 10 and notably the wiper rubber 11 undergo a deformation. This deformation is in this case notably a deformation of the longitudinal direction of the wiper rubber 11. This deformation enables the windscreen wiper frame 10 to fit the curve of the outer surface of the glass 30, as described above. In other words, the deformation of the wiper rubber 11 enables said wiper rubber to fit the curve of the glass 30.

The piezoelectric film 2 is designed and arranged to be deformed during the movement of the windscreen wiper frame 10. In particular, the piezoelectric film 2 is designed to be deformed by the wiper rubber 11 and/or by the spline 15 of the windscreen wiper frame 10. This deformation of the piezoelectric film 2 then generates electricity.

The electric current created by the piezoelectric film 2 is in this case a function of the position of the windscreen wiper frame 10 on the glass 30 and therefore of the shape of the glass 30 in the contact zone between the glass 30 and the wiper rubber 11. The electric current created is also a function of the direction of movement of the windscreen wiper frame 10, i.e. as the windscreen wiper frame moves from the idle position P1 to the stop position P2 or inversely from the stop position P2 to the idle position P1.

As a variant or cumulatively, the deformation of the piezoelectric film 2 and the creation of an electric current are caused by the vibrations and other shocks caused by the movement of the motor vehicle.

As a variant or cumulatively, a piezoelectric film 2 can be arranged on one of the first and second side faces 116, 117 of the wiper rubber 11. In particular, the piezoelectric film 2 can for example be glued to one of the first and second side faces 116, 117. The piezoelectric film 2 thus arranged then undergoes substantially the same deformations as the side face 116 or 117 on which said film is arranged.

In particular, the piezoelectric film 2 extends in this case longitudinally along the side face 116 all 117. The piezoelectric film 2 is for example arranged such as to cover some or all of the side face 116, 117 on which said film is arranged.

As mentioned above, the movement of the wiper rubber 11 on and across the glass 30 causes deformations of the side faces 116, 117. Consequently, the movement of the wiper rubber 11 on and across the glass 30 causes the deformations of the piezoelectric film 2. The deformations of the piezoelectric film 2 thus enable an electric current to be generated.

The friction between the wiper rubber 11 and the glass during movement of the windscreen wiper frame 10 enables the piezoelectric film 2 to generate an electric current.

A piezoelectric film 2 can be arranged on each of the side faces 116, 117 of the wiper rubber 11 to increase the electric current generated during the movement of the windscreen wiper frame 10.

Electrical Energy Accumulation Device

The wiping device 1 can include an electrical energy accumulation device (not shown). The electrical energy accumulation device is in this case connected to the piezoelectric film 2 and designed to be supplied with electrical energy thereby. In other words, the electrical energy accumulation device is designed to enable the energy created by the piezoelectric film 2 to be stored. The electrical energy accumulation device notably means that the electrical energy created by the piezoelectric film 2 does not have to be used immediately if said electrical energy is not required and/or if said energy is not immediately available, for example when the vehicle and the wiping device are stopped.

The electrical energy accumulation device is for example a capacitor, a super-capacitor, an electric battery or a bank of accumulators. The electrical energy accumulation device can be arranged close to or in the immediate vicinity of the piezoelectric film 2. In this particular case, the electrical energy accumulation device is arranged in one of the lower or upper cavities 134, 132 of the holder 13.

Mechanical Adjustment Device and Control Module

In this case, the wiping device 1 also includes a mechanical adjustment device 50 and a control module for the mechanical adjustment device 50.

The mechanical adjustment device 50 is a device designed to adjust the contact pressure between the wiper rubber 11 and the glass 30. The mechanical adjustment device 50 is for example designed to vary a torque applied to the arm 20 of the wiping device 1. Varying the torque makes it possible to vary the contact pressure between the windscreen wiper frame 10 and the glass 30. In this case, the mechanical adjustment device 50 can include a torsion spring for this purpose at the proximal end of the arm 20 of the wiping device.

The mechanical adjustment device 50 and the control module make it possible to prevent or mitigate a reduction in the contact pressure liable to occur when the motor vehicle is traveling at high speeds.

The control module is designed to control the mechanical adjustment device 50 as a function of the current created by the piezoelectric film 2. As such, the control module makes it possible for example to maintain a substantially constant contact pressure between the windscreen wiper frame 10 and the glass 30. To do so, the control module is connected to the piezoelectric film 2. Indeed, the electric current created by the piezoelectric film 2 is notably a function of the contact pressure between the windscreen wiper frame 10 and the glass 30.

The invention also relates to a method for adjusting the contact pressure for the wiping device 1 described above, comprising the following successive steps:

analysis of the electric current created by the piezoelectric film 2, determination of the contact pressure between the wiper rubber 11 and the glass 30, comparison of the contact pressure with a predetermined reference value, controlling the mechanical adjustment device 50 to bring the value of the contact pressure towards the reference value.

Heating Module

The wiping device 1 can include a heating module 17. The heating module 17 is designed to be supplied with electrical energy by the piezoelectric film 2. The heating module 17 is in this case a resistive heating film 17.

The heating film 17 is designed to be mounted on or inside the windscreen wiper frame 10. The heating film 17 is for example arranged inside either the lower cavity 134 or the upper cavity 132 of the holder 13 of the windscreen wiper frame 10. In this case, the heating film 17 is arranged inside the upper cavity 132. In particular, the heating film 17 is in this case arranged on and in contact with the upper flat face 152 of the spline 15.

The heating film 17 is in this case a thin strip of material extending longitudinally in a main longitudinal direction from the first end to the second end of the windscreen wiper frame 10. The heating film 17 behaves like an electrical heating resistor to generate heat when the electric current generated by the piezoelectric film 2 passes through the heating film.

Spray Module

The wiping device 1 also includes a spray module (not shown). The spray module in this case includes a solenoid valve. Solenoid valve shall mean an electrically controlled valve.

In this particular case, the solenoid valve is a two-way solenoid valve. The solenoid valve is designed to be supplied with electrical energy using the electric current created by the piezoelectric film 2.

The solenoid valve is in this case mounted on the windscreen wiper frame 10. In particular, the solenoid valve is for example mounted at a joint of the arm 20 and the windscreen wiper frame 10.

The solenoid valve is in this case designed to alternately enable a first liquid spray or a second liquid spray. The liquid dispensed can be water, cleaning liquid or de-icing liquid. As a variant, the solenoid valve can be designed to enable the first and second sprays simultaneously.

In this case, the first spray is a projection of liquid in a first direction. The second spray is a projection of liquid in a second direction, notably substantially opposite the first direction.

The first and second spray directions are in this case substantially orthogonal to the main longitudinal direction of the windscreen wiper frame. In other words, the first and second sprays are sprays on either side of the windscreen wiper frame 10.

The spray module is designed to enable a spray in the direction of movement of the windscreen wiper frame 10. In other words, the solenoid valve is designed to enable either one of the sprays as a function of the direction of movement of the windscreen wiper frame 10.

The invention also relates to a spray method for a wiping device 1 as described above. The spray method is designed to enable a spray in the direction of movement of the windscreen wiper frame 10. The spray method comprises the following successive steps:

- analysis of the electric current generated by the piezoelectric film 2,
- detection of a change of direction of the windscreen wiper frame 10,
- triggering and/or stoppage of at least one of the first and second sprays.

The detection of a change of direction of the windscreen wiper frame 10 amounts to detecting that the windscreen wiper frame 10 is approaching either the stop position P2 or the idle position P1. This step works by analyzing the electric current created by the piezoelectric film 2. Indeed, as mentioned above, the electric current created by the piezoelectric film 2 depends notably on the position of the windscreen wiper frame 10 as well as the direction of movement of the windscreen wiper frame 10.

Thus, each time the windscreen wiper frame 10 approaches the stop position P2, the piezoelectric film 2 generates the same electric current. Analysis and/or measurement of the electric current created by the piezoelectric film 2 therefore enables detection of an imminent change of direction of movement of the windscreen wiper frame 10. Equally, analysis and/or measurement of the electric current created by the piezoelectric film 2 enables the approach of the windscreen wiper frame 10 to the idle position P1 to be detected.

In particular, the piezoelectric film 2 in this case generates a first current of voltage $U_1$ and of intensity $I_1$ when the windscreen wiper frame 10 reaches the idle position P1. Furthermore, the piezoelectric film 2 generates a second current of voltage $U_2$ and intensity $I_2$ when the windscreen wiper frame 10 reaches the stop position P2.

In each case, measuring either the first current or the second current makes it possible to detect an imminent change of direction of the windscreen wiper frame 10 and to adapt the spray accordingly using the solenoid valve.

As a variant, if the piezoelectric film 2 is arranged on one of the side faces 116, 117 of the wiper rubber 11, the electric current generated by the piezoelectric film 2 can be used to detect a change of direction of the windscreen wiper frame 10.

For example, if the piezoelectric film 2 is arranged on the first side face 116, then the compression, in this case substantially in a direction orthogonal to the main longitudinal direction of the wiper rubber 11, of the piezoelectric film 2 makes it possible to detect that the windscreen wiper frame 10 has left the position P1 and is moving in an upward direction. Conversely, the stretching, in this case substantially in a direction orthogonal to the main longitudinal direction of the wiper rubber 11, of the piezoelectric film 2 arranged on the first side face 116 makes it possible to detect that the windscreen wiper frame 10 has left the position P2 and is moving in a downward direction.

As a variant and as shown in FIGS. 4 and 5, if the piezoelectric film 2 is arranged on the second side face 117, then the compression, in this case substantially in a direction orthogonal to the main longitudinal direction of the wiper rubber 11, of the piezoelectric film 2 makes it possible to detect that the windscreen wiper frame 10 has left the position P2 and is moving in a downward direction. Conversely, the stretching, in this case substantially in a direction orthogonal to the main longitudinal direction of the wiper rubber 11, of the piezoelectric film 2 makes it possible to detect that the windscreen wiper frame 10 has left the position P1 and is moving in an upward direction.

In this case, the solenoid valve is connected to the piezoelectric film 2. The solenoid valve is designed to enable the first spray when the piezoelectric film 2 generates the first current. The solenoid valve is also designed to enable the second spray when the piezoelectric film 2 generates the second current.

In this particular case, the first spray is a spray in the upward direction, while the second spray is a spray in the downward direction.

The spray method enables the use of a single pump notably with a single nozzle between a tank of the liquid to be dispensed and the windscreen wiper frame 10. Furthermore, the spray method obviates the need for a link between the motor of the wiping device 1 and the pump.

Counting Module and Warning Method

As shown notably in FIG. 1c, the wiping device 1 also includes a counting module 9 and an audible and/or luminous warning device (not shown).

The counting module 9 is in this case mounted directly on the windscreen wiper frame 10. Equally, the warning device is mounted directly on the windscreen wiper frame 10. The counting module 9 and the warning device are connected to one another. Both elements are designed to be supplied with electrical energy by the piezoelectric film 2.

The counting module 9 is designed to analyze or measure the current created by the piezoelectric film 2 in order to count the number of to-and-fro movements made by the windscreen wiper frame 10. In this particular case, the counting module 9 is designed to increment by 1 a value n with each to-and-fro movement of the windscreen wiper frame 10. The value n is therefore a real-time value of the number of to-and-fro movements made by the windscreen wiper frame 10.

In particular, the counting module 9 can be configured to increment n each time the piezoelectric film 2 generates either the first electric current or the second electric current.

A predetermined threshold value m representing a number of to-and-fro movements of the windscreen wiper frame 10 is used to determine the need to change or maintain some or all of the wiping device 1. By way of a purely illustrative example and as a function of the robustness of the elements of the wiping device 10, the value of m can be set to 100,000 or 250,000 or even 500,000.

As shown in FIG. 6, the counting module 9 is designed such that the counting module 9 activates the warning device when n=m. Activation of the warning device makes it possible to warn a user of the motor vehicle that the condition of the wiping device 1 needs to be checked or replaced in full or in part.

As a variant, the audible and/or luminous warning device is arranged in the passenger compartment of the motor vehicle. On the windscreen wiper frame 10, the audible and/or luminous warning device is replaced by a transmitter/receiver connected to the counting module 9.

The transmitter/receiver is then designed to remotely activate the audible and/or luminous warning device when n=m.

The invention also relates to a warning method for a wiping device 1 as described above. The warning method is designed to warn a user of the motor vehicle of the potential wear of one or more elements of the wiping device 1. For this purpose, the warning method comprises the following successive steps:
  analysis of the electric current generated by the piezoelectric film 2,
  counting the number of to-and-fro movements of the windscreen wiper frame 10,
  creating a warning signal when the number of to-and-fro movements reaches a threshold value.

The warning method thus enables the user of the vehicle to be warned of the need to replace some or all of the wiping device 1. The warning method thus simplifies maintenance of the wiping device 1. Furthermore, the method enables precise real-time monitoring of the use of the windscreen wiper frame 10.

Aerodynamic Deflector

Figure 3:
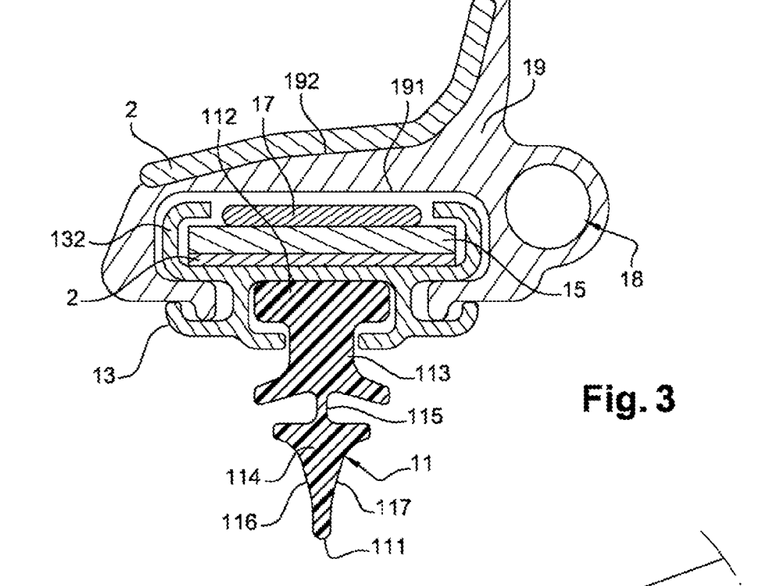
FIG. 3 is a cross section view of a windscreen wiper frame according to a different embodiment of the invention.

As shown in FIGS. 2 and 3, the wiping device 10 can include an aerodynamic deflector 19. The aerodynamic deflector 19 is also referred to as a spoiler. The aerodynamic deflector 19 in this case extends longitudinally along and about the holder 13 of the windscreen wiper frame 10.

The aerodynamic deflector 19 is designed to hold the windscreen wiper frame 10 against the outer surface of the glass 30, notably when the motor vehicle is traveling at high speed. In particular, the aerodynamic deflector 19 is designed to hold the windscreen wiper frame 10 pressed against the outer surface of the glass 30 under the effect of an air flow created by the movement of the motor vehicle.

The aerodynamic deflector 19 in this case extends substantially from one end of the holder 13 of the windscreen wiper frame 10 to the other. The aerodynamic deflector 19 is arranged on an upper portion of the windscreen wiper frame 10. In particular, the aerodynamic deflector 19 is in this case assembled on the holder 13 of the windscreen wiper frame 10 to cover at least a portion of the upper end of the holder 13.

The aerodynamic deflector 19 in this case has an inner face 191 and an outer face 192. The inner face 191 of the aerodynamic deflector 19 is designed to face the holder 13 once the aerodynamic deflector 19 has been assembled with the windscreen wiper frame 10. In other words, the inner face 191 of the aerodynamic deflector 19 is oriented towards the windscreen wiper frame 10. The outer face 192 of the aerodynamic deflector 19 is oriented towards the outside of the windscreen wiper frame 10. The outer face is designed to be in contact with the air flow created by the movement of the motor vehicle.

Deformation by the Air Flow

Figure 3A:
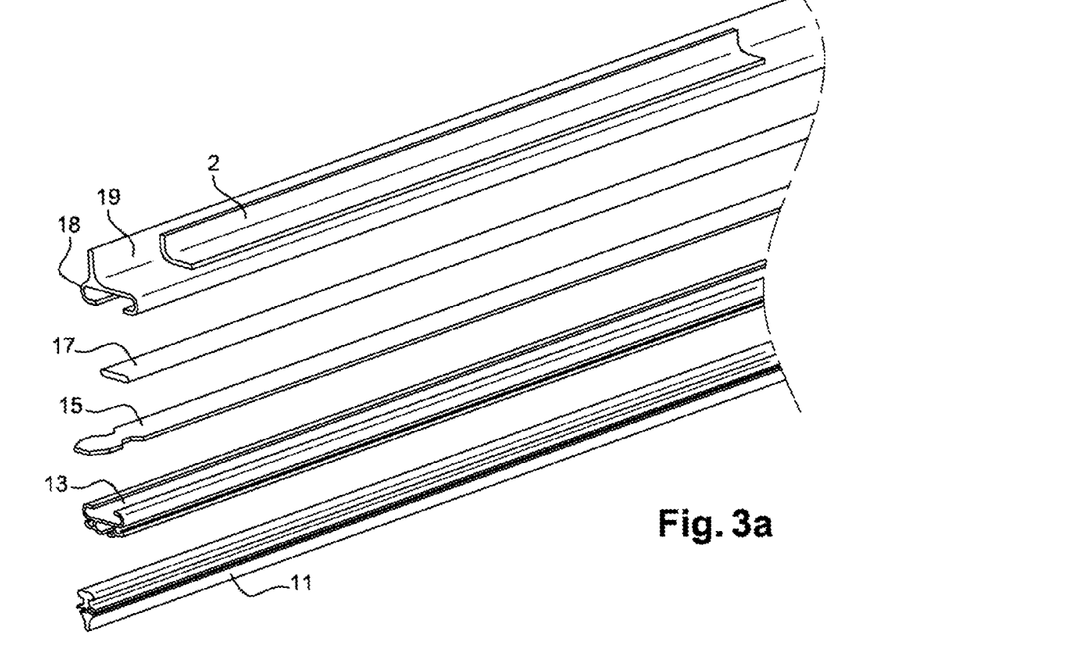
FIG. 3a is an exploded perspective view of a portion of a windscreen wiper frame according to another embodiment of the invention.

As shown in FIGS. 3 and 3a, cumulatively or as a variant, a piezoelectric film 2 can be arranged on the aerodynamic deflector 19 of the windscreen wiper frame 10. In particular, a piezoelectric film 2 is in this case arranged on the outer face 192 of the aerodynamic deflector 19. In this case, the deformation of the aerodynamic deflector 19 when same is exposed to an air flow results in the deformation of the piezoelectric film and the creation of an electric current by the piezoelectric film 2.

As a variant and as shown in FIG. 1b, the wiping device 1 has two windscreen wiper frames 10. One and/or the other of the two windscreen wiper frames 10 are fitted with a piezoelectric film 2.

The invention claimed is:

1. A wiping device for a motor vehicle glass, comprising:
  a windscreen wiper frame comprising a spline; and
  a piezoelectric film arranged against the spline of the windscreen wiper frame such as to produce an electric current,
  wherein the piezoelectric film is deformed by the spline.

2. The wiping device as claimed in claim 1, in which the windscreen wiper frame has the wiper rubber configured to be in contact with the glass and to locally fit the shape thereof, the piezoelectric film being arranged on the windscreen wiper frame such as to be deformed with the wiper rubber and to generate the electric current when the windscreen wiper frame moves on the glass.

3. The wiping device as claimed in claim 1, in which the piezoelectric film is configured to be deformed under an effect of vibrations and/or shocks created by operation of the motor vehicle.

4. The wiping device as claimed in claim 1, in which the piezoelectric film is configured to be deformed under an effect of an air flow about the motor vehicle.

5. The wiping device as claimed in claim 1, further comprising an electrical energy accumulation device selected from a group consisting of: a capacitor, a supercapacitor and a battery, that is configured to be supplied with electric current by the piezoelectric film.

6. The wiping device as claimed in claim 1, further comprising a mechanical adjustment device that is configured to modify a contact pressure between the glass and the windscreen wiper frame as a function of the electric current created by the piezoelectric film.

7. The wiping device as claimed in claim 1, further comprising a heating module configured to be supplied with electric current by the piezoelectric film.

8. The wiping device as claimed in claim 1, wherein the piezoelectric film is in contact with a lower face of the spline.

9. A wiping device for a motor vehicle glass, comprising:
  a windscreen wiper frame comprising an aerodynamic deflector; and
  a piezoelectric film arranged against the aerodynamic deflector of the windscreen wiper frame such as to produce an electric current,
  wherein the piezoelectric film is deformed by the aerodynamic deflector.

10. The wiping device as claimed in claim 9, wherein the piezoelectric film is arranged on top of the aerodynamic deflector.

11. A wiping device for a motor vehicle glass, comprising:
a windscreen wiper frame comprising a component;
a piezoelectric film mounted on the component of the windscreen wiper frame such as to produce an electric current; and
an electrical energy accumulation device selected from a group consisting of: a capacitor, a super-capacitor and a battery, that is configured to be supplied with electric current by the piezoelectric film,
wherein the piezoelectric film is deformed by the component,
wherein the component is at least one selected from the group consisting of: a wiper rubber, at least one spline, and an aerodynamic deflector.

* * * * *